United States Patent [19]

Mirza et al.

[11] Patent Number: 5,567,216

[45] Date of Patent: * Oct. 22, 1996

[54] GREASE FILTER ASSEMBLY

[75] Inventors: Daryl Mirza, Zion; Robert A. Barasa, Lake Forest, both of Ill.

[73] Assignee: DGA Industries, Inc., Zion, Ill.

[ * ] Notice: The term of this patent shall not extend beyond the expiration date of Pat. No. 5,512,073.

[21] Appl. No.: 476,717

[22] Filed: Jun. 7, 1995

Related U.S. Application Data

[63] Continuation-in-part of Ser. No. 293,154, Aug. 19, 1994, Pat. No. 5,512,073.

[51] Int. Cl.⁶ .................................................. B01D 35/00
[52] U.S. Cl. ........................... 55/323; 55/486; 55/494; 55/DIG. 36; 126/299 R; 454/49; 454/366
[58] Field of Search .......................... 55/323, 486, 487, 55/493, 494, 501, DIG. 36; 126/299 D, 299 E, 299 R, 300, 301; 454/41, 49, 341, 365, 366

[56] References Cited

U.S. PATENT DOCUMENTS

| | | |
|---|---|---|
| 143,339 | 9/1873 | Frazer . |
| 1,090,026 | 3/1914 | Chillis . |
| 2,847,085 | 8/1958 | Ehlers .................................. 183/51 |
| 3,566,585 | 3/1971 | Voloshen et al. ..................... 55/435 |
| 3,660,969 | 5/1972 | Fox ..................................... 55/385.1 |
| 3,695,164 | 10/1972 | Stalker . |
| 3,760,566 | 9/1973 | Zievers et al. ....................... 55/223 |
| 4,323,373 | 4/1982 | Fritz . |
| 4,325,290 | 4/1982 | Wolfert . |
| 4,350,504 | 9/1982 | Diachuk .............................. 55/217 |
| 4,450,756 | 5/1984 | Kling . |
| 4,610,705 | 9/1986 | Sarnosky et al. . |
| 4,635,617 | 1/1987 | Simonsen .......................... 55/DIG. 36 |
| 4,673,423 | 6/1987 | Yumlu ................................ 55/319 |
| 4,869,236 | 9/1989 | Blough ............................. 55/DIG. 36 |
| 4,887,588 | 12/1989 | Rial .................................. 126/299 R |
| 4,923,725 | 5/1990 | Zafiroglu ........................... 428/36.4 |
| 5,078,047 | 1/1992 | Wimberly ........................... 454/366 |
| 5,196,040 | 3/1993 | Malloy et al. ....................... 55/323 |
| 5,318,607 | 6/1994 | Malloy et al. ....................... 55/323 |

OTHER PUBLICATIONS

Grainger Industrial and Commercial Equipment and Supplies, Fall 1993 General Catalog No. 384, pp. 2707, 2708, 2710.

Undated brochure entitled "Cook's 'Grease Terminator'", Loren Cook Company.

Unnumbered and Undated page from Grease Guard, Inc. brochure, entitled "Don't Let Grease Damage Soak Up Your Profits"!.

(List continued on next page.)

*Primary Examiner*—C. Scott Bushey
*Attorney, Agent, or Firm*—Fitch, Even, Tabin & Flannery

[57] ABSTRACT

A grease filter assembly is provided for absorbing grease discharged from a spout of a grease discharge vent extending from a roof. A support frame is mountable to the duct of the grease discharge vent and a grease absorbing pad is supportable upon the support frame in stationary position below the spout and in spaced relation from the roof. The support frame includes support rods mounted adjacent respective sides of the discharge vent duct and can extend beyond their respective duct sides to overlap at two corners of the duct to provide a supporting grid including the end portions of each of two rods extending from two corners of the duct. A grease absorbing pad is supported on the supporting grid disposed adjacent a side of the duct. The pad can be of sufficient length to extend beyond the duct side on both ends. U-shaped retaining clips are slid onto the ends of each of the rods extending normal to the side adjacent the pad and have a lower rod receiving portion through which the retaining clips are slid onto the ends of the rods, with the edge of the pad being received in the channel of the retaining clips. A tension cord extends between each retaining clip and a rod adjacent the side opposite to the side adjacent the pad or to brackets on the corners of the opposite side to retain the pad in engagement with the support frame and to bias the pad into abutment with a side of the duct.

9 Claims, 6 Drawing Sheets

OTHER PUBLICATIONS

Unnumbered and undated page from Grease Guard, Inc. brochure captioned "Grease Guard™ Meets the 'Competition'".

Unnumbered and undated page captioned "Accessories & Options".

Unnumbered and undated page captioned "Direct and Belt Drive Upblast Centrifugal Roof Exhausters Models CUE and CUBE".

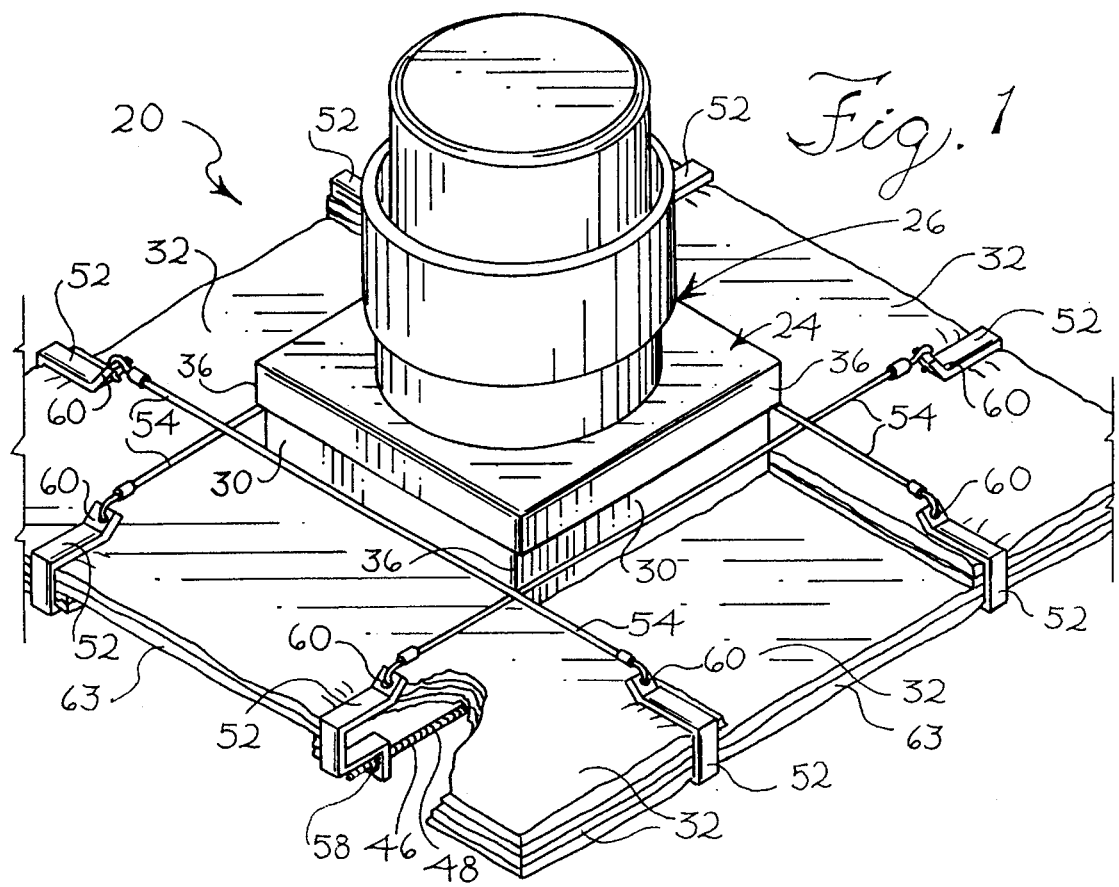
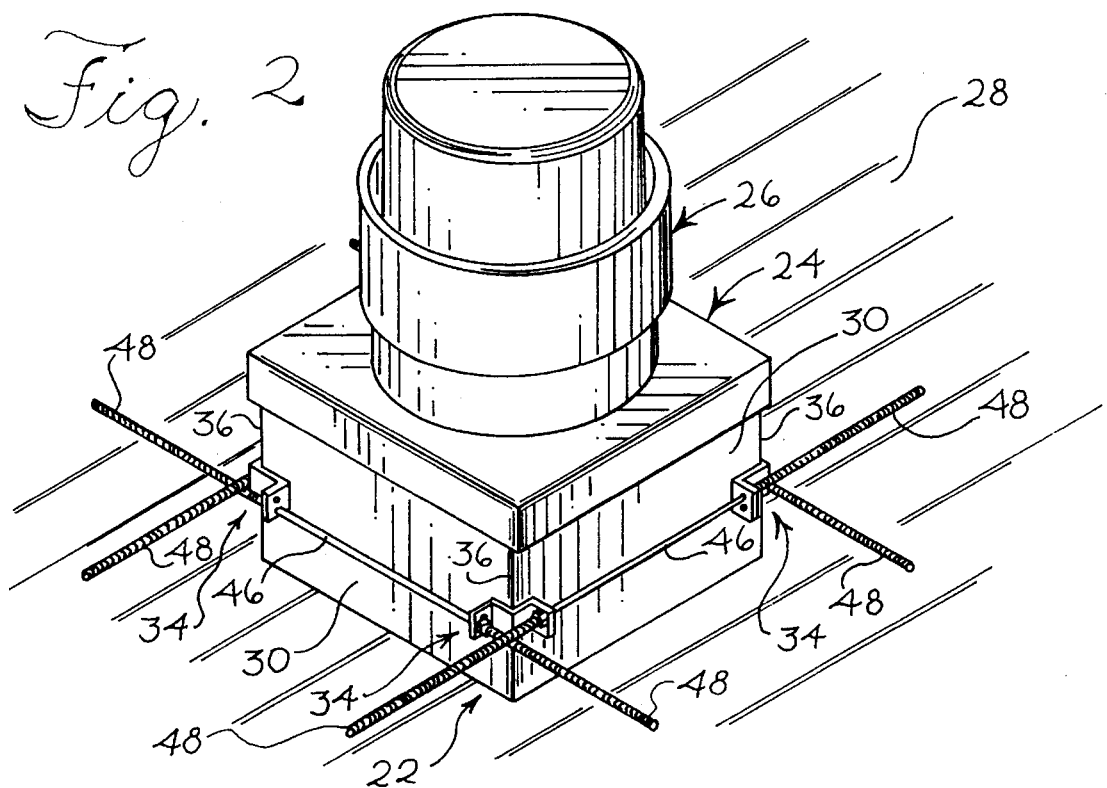

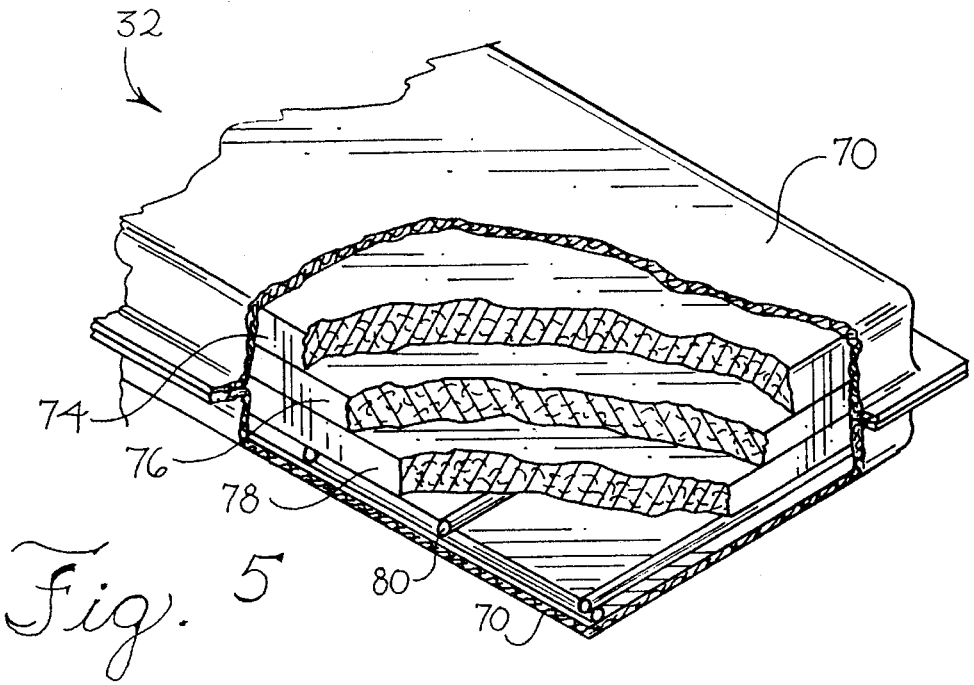
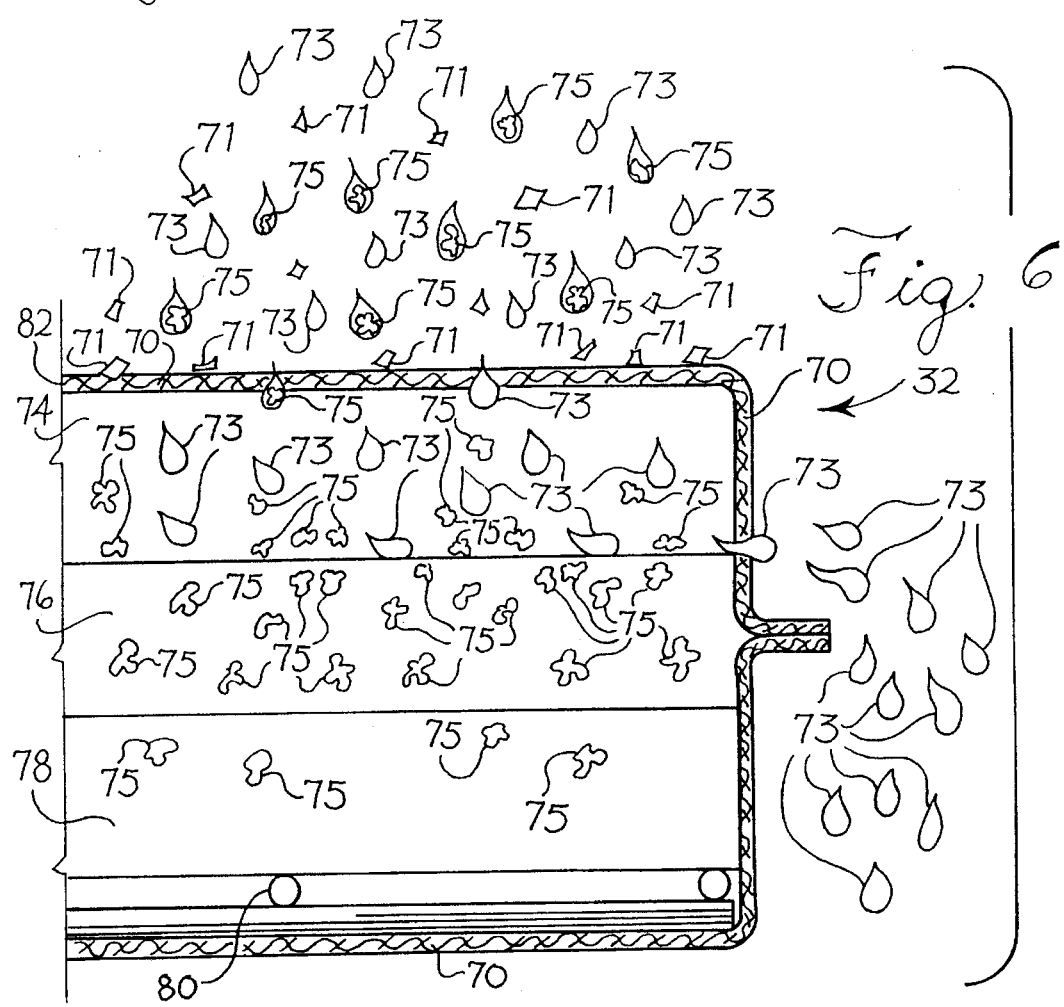

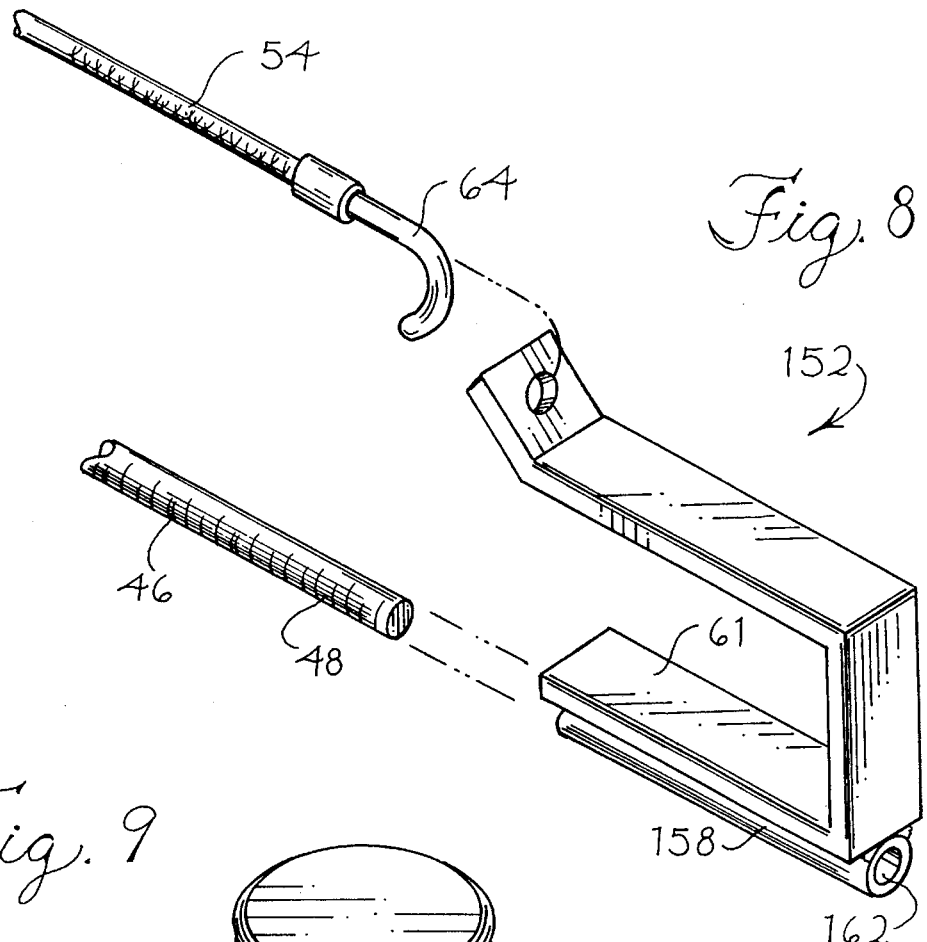
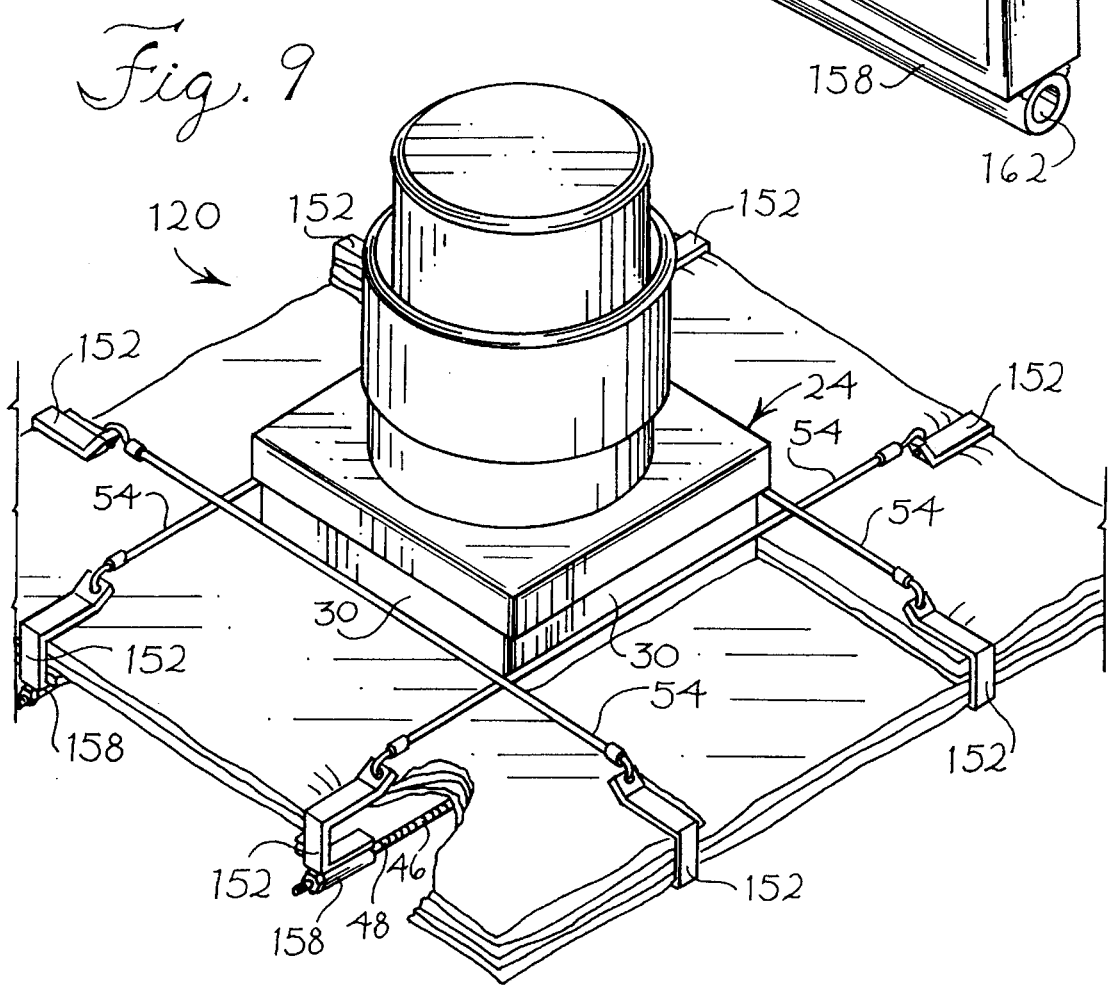

5,567,216

1
GREASE FILTER ASSEMBLY

RELATION TO OTHER APPLICATIONS

This application is a continuation-in-part of U.S. patent application Ser. No. 08/293,154, filed on Aug. 19, 1994, now U.S. Pat. No. 5,512,073 which is hereby incorporated by reference.

FIELD OF THE INVENTION

The present invention pertains to filter assemblies for collecting airborne grease discharged from vents.

BACKGROUND OF THE INVENTION

Many facilities, such as restaurants, have production processes which require the discharge of high volumes of grease through roof-mounted discharge vents. The discharged grease may accumulate on the roof and cause deterioration of the roofing materials surrounding the grease discharge vent, including the flashing and gaskets associated with the vent installation. These roofing materials are typically organic materials which may deteriorate rapidly when exposed to grease. Various filters and grease traps disposed between the grease generating source and the discharge vent have been used to reduce the quantity of airborne grease discharged from the discharge vent. However, such devices have been unsuccessful in absorbing or trapping all of the grease, and even when such filters are employed, a significant amount of grease is still discharged from the discharge vent and onto the roof. Thus, there is a need for a filter assembly for absorbing or trapping grease discharged from roof-mounted discharge vents.

One such filter assembly is disclosed in U.S. Pat. No. 5,196,040 entitled "Grease Trap and Filter Apparatus". This patent discloses a frame structure which is mounted directly to the roof through which the discharge vent projects. Grease absorbing material has a central portion cut out corresponding to the specific shape of the discharge vent. The grease absorbing material is disposed inwardly of the roof-mounted frame structure, surrounding the discharge vent. This roof-mounted design suffers numerous shortcomings. Among the shortcomings associated with the patented roof-mounted design is that the frame structure is mounted directly to the roof. While the roof-mounted frame may be suitable for those applications in which the roof section immediately surrounding the discharge vent is flat and extends substantially perpendicularly with respect to the discharge vent extending therefrom, the roof-mounted frame does not lend itself to use in the wide variety of applications in which the roof section surrounding the discharge vent is angled with respect to the discharge vent extending from the roof section. There is a need for a filter assembly which is well suited for any type of roof surface or roof configuration.

Another shortcoming associated with the roof-mounted frame structure of the patented design is that it is not suitable for use with tall discharge vents which extend a substantial distance from the roof. The roof-mounted frame structure may be disposed too far away from the high, grease discharging end of the discharge vent to catch the airborne grease before it blows beyond the confines of the frame structure and onto the roof. There is a need for a filter assembly which catches grease discharged from a discharge vent regardless of the height which the discharge vent extends from the roof.

2

A still further shortcoming associated with the aforementioned patented device is the requirement that the grease absorbing material be cut specifically for each different application to correspond to the particular shape of that specific discharge vent. That is, the grease absorbing material is disposed inwardly of the frame structure and between the frame structure and the discharge vent, requiring that the grease absorbing material be cut accurately to fit snugly between the frame and the periphery of the discharge vent. There is a need for a filter assembly which lends itself to use with discharge vents of a wide variety of shapes and sizes, without requiring cutting of the grease absorbing material to correspond to each separate specific shape and sizes.

Moreover, the aforementioned patented device requires screwing or nailing flashing onto the discharge vent duct itself to properly direct leaking grease onto the grease-absorbing material. Many municipal codes prohibit screwing into the duct stack. Therefore, there is a need for a grease filter device which is mountable to a grease discharge vent in a secure, stationary position while maintaining the integrity of the discharge vent duct.

There is a need for a filter assembly which overcomes each of the aforementioned shortcomings of the prior art construction, and which also lends itself to inexpensive production and allows for easy removal and replacement of used grease absorbing materials.

SUMMARY OF THE INVENTION

In accordance with the present invention, a filter assembly for absorbing or trapping grease from a grease discharge vent is provided which is mountable directly to the discharge vent duct, rather than being mountable to the roof itself. This allows the same filter assembly to be employed regardless of the specific type or configuration of the roof section at the discharge vent. For high to tall discharge vents, the filter assembly may be mounted to the discharge vent closely adjacent the grease discharging end of the vent so that the large distance between the grease discharging end of the vent and the roof is not detrimental to satisfactory grease absorption, as there is little space for the discharged grease to fall or be blown before striking the grease filter assembly. Still further, rather than being disposed between an outer frame and the periphery of the discharge vent as in prior art roof-mounted structures, which require cutting the grease absorbing material to correspond to the specific shape and size of each different discharge vent, the filter assembly of the present invention provides a support frame upon which grease absorbing pads rest, and beyond which the grease absorbing pads may extend, so that the grease absorbing pads do not have to be cut specific to each application. Additionally, the filter assembly is mountable to the discharge vent at any height therealong by clamping about the discharge vent, without the need for screwing or nailing into the discharge vent duct.

More specifically, the filter assembly of the present invention comprises a support frame having a plurality of support rods for being positioned generally horizontally adjacent respective sides of the discharge vent duct. The support frame further comprises a plurality of mounting brackets which are mountable at respective corners of the discharge vent duct with each mounting bracket having a pair of rod receiving apertures for receiving and supporting a respective pair of the support rods in substantially perpendicular relation to one another at the corners of the discharge vent duct. The ends of the rods are threaded and nuts are screwed onto the threaded ends of the rods to pull the mounting brackets toward one another to clamp the mounting brackets and support rods about the discharge vent in a stationary position. Hence, the mounting brackets and support rods define a support frame secured in spaced relation from the roof through which the discharge vent duct extends. The support rods are longer than their respective sides of the discharge vent duct, and the end portions of the rods extend beyond both ends of their respective duct sides to provide a supporting grid consisting of the end portions of each of two rods extending from adjacent walls of the duct. A plurality of grease absorbing pads are freely supportable on top of the support rods adjacent respective sides of the discharge vent duct and in spaced relation from the roof. Retaining clips, each defining a generally U-shaped channel, are engageable with respective support rods, with the edges of respective grease absorbing pads being received in the channels of the retaining clips. Tensioning cords are provided for spanning the retaining clips which are disposed on opposite sides of the discharge vent from one another to pull the pair of oppositely disposed retaining clips toward one another, together with the grease absorbing pads disposed in the channels of the retaining clips, to maintain the grease absorbing pads received in the channels of the retaining clips in abutment with respective sides of the discharge vent. Hence, the grease filter assembly securely supports a plurality of grease absorbing pads about the grease discharge vent duct adjacent the grease discharging end of the grease discharge vent and in spaced relation from the roof so that discharged grease falls immediately onto the grease absorbing pads. Since the pads rest upon the support structure, disengagement of the tensioning cords and removal of the retaining clips is all that is required to facilitate simple removal of soiled grease absorbing pads for disposal. Replacement with new grease absorbing pads is easily and rapidly carried out by sliding the retaining clips back onto their respective support rods and reattaching the tension cords.

In another embodiment, a single grease-absorbing pad is positioned adjacent a side of a discharge vent duct. This embodiment is preferred where the discharge vent duct includes, or which can be adapted to include, a spout which can direct grease onto the single pad. With such a single pad assembly, the support grid is modified such that only the portions of the rods at the corners of the side to which the pad is abutted need be extended beyond the ends of their respective duct sides to support the single grease-absorbing pad on top of these rod portions. By utilizing a single pad, only two retaining clips need be utilized with respective tension cords connected at one end to the clips and at the other end to projecting ends of a rod positioned adjacent the vent duct side opposite to the side of the discharge vent duct abutting the pad or to an open hole in the bracket at the corner of the opposite vent duct side, thereby pulling the clips into engagement with the pad and moving the pad into engagement with the duct side below the vent spout. Thus, the single-side grease filter assembly securely maintains a single pad on top of the extended rod portions in abutment with the duct side below the grease-discharge spout.

BRIEF DESCRIPTION OF THE DRAWINGS

In the drawings, wherein like elements are referenced alike:

FIG. 1 is a perspective view of a grease filter assembly embodying various features of the present invention, shown mounted to a grease discharge vent duct;

FIG. 2 is a perspective view of mounting brackets and rods mounted to a grease discharge vent duct to form a support frame, with grease absorbing pads freely supported on the support frame indicated in skeleton;

FIG. 5 is a cutaway perspective view of a grease absorbing pad of the grease filter assembly of FIG. 1 embodying various features of the present invention;

FIG. 6 is a cutaway side elevational view of a representative grease absorbing pad of the grease filter assembly of FIG. 1;

FIG. 8 is another embodiment of the retaining clip of FIG. 1;

FIG. 9 is a perspective view of another filter assembly, employing the retaining clip of FIG. 8.

DETAILED DESCRIPTION OF THE PREFERRED EMBODIMENTS

Figure 3:
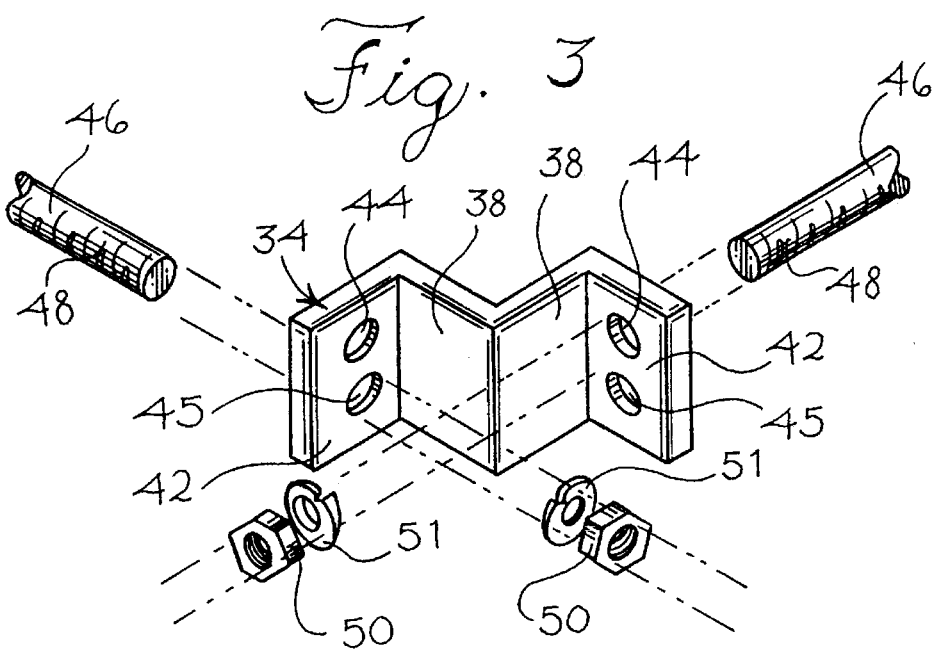
FIG. 3 is an enlarged perspective view of a mounting bracket of the grease filter assembly of FIG. 1 embodying various features of the present invention.

A filter assembly embodying various features of the present invention is illustrated in FIG. 1, and referred to generally by reference numeral 20. The grease filter assembly 20 comprises a support frame, referred to generally by reference numeral 22, which mounts to the duct 24 of a grease discharge vent 26 in spaced relation from the roof 28 through which the discharge vent extends. Grease absorbing pads 32 are supportable on the support frame 22 adjacent respective walls 30 of the duct 24 and retained in position on the support frame 22 surrounding the discharge vent duct 24 by pad retaining means as described below. Since the support frame 22 mounts to the discharge vent duct 24 rather than the roof 28, the filter assembly 20 of the present invention is well suited for employment with any type of roof surface or roof configuration. Also, because the support frame 22 mounts to the duct 24 rather than the roof 28, the grease absorbing pads 32 may be supported directly beneath the discharge vent 26 regardless of the height which the grease discharge duct 24 extends from the roof 28. Furthermore, since the grease absorbing pads 32 are supported upon the support frame 22 each adjacent a respective side 30 of the discharge vent duct, rather than being disposed within the periphery of a support frame as in the prior art, it is not necessary to cut or otherwise customize the shapes of the grease absorbing pads 32 to accommodate differently shaped and sized ducts 24. Still further, the support frame clamps about the discharge vent duct so that it is not necessary to screw or nail into the discharge vent duct. These and other advantages over prior art grease absorbing filter assemblies are provided in a filter assembly 20 which is inexpensive, easy to install, and lends itself to simple and rapid replacement of soiled grease absorbing materials.

More specifically, with reference to FIG. 2, the support frame 22 comprises mounting brackets 34 for mounting at respective corners 36 of the discharge vent duct 24. As seen in FIG. 3, the mounting brackets 34 are each integral components having a pair of perpendicularly extending walls 38 for being positioned flush against respective walls 30 of the discharge vent duct 24 at its corners 36. The mounting brackets 34 also have a pair of flanges 42 extending perpendicularly from respective ends of the pair of walls 38. Hence, with a mounting bracket 34 mounted at a corner 36 of the duct 24, each of the pair of flanges 42 extends substantially perpendicularly from a respective wall 30 of the duct 24. As best seen in FIG. 2, with mounting brackets 34 mounted at each of the four corners 36 of the duct 24, each wall 30 of the duct 24 has two flanges 42 extending substantially perpendicularly therefrom, with one flange 42 near either end of each wall 30 of the duct 24.

Each of the flanges 42 of the mounting brackets 34 has a pair of vertically offset rod-receiving apertures 44 and 45 for receiving support rods 46 adjacent respective walls 30 of the duct 24. As discussed above, with mounting brackets 34 at each corner 36 of the duct 24, each wall 30 of the duct 24 has a pair of mounting bracket flanges 42 extending perpendicularly therefrom. Support rods 46 are received in the respective rod-receiving apertures 44 and 45 of the pair of flanges 42 extending from each wall 30 of the duct 24 to support the support rods 46 adjacent respective walls 30 of the duct 24. The support rods 46 are made longer than the width of the duct walls 30 against which they are disposed so that the end portions 48 of the support rods 46 extend beyond the ends of the respective walls 30 of the duct 24 to thereby provide a supporting grid consisting of the end portions 48 of each of the two support rods 46 extending from adjacent walls 30 of the duct 24, as seen in FIG. 2.

It will now be appreciated that the pairs of vertically offset rod-receiving apertures 44 and 45 prevent interference of the rods 46 at the corners 36 where the rods 46 cross one another. That is, the pair of flanges 42 extending outwardly from respective opposite walls 30 of the duct 24 receive respective support rods 46 through their upper apertures 44, the pairs of flanges 42 extending outwardly from the other pair of opposite walls 30 of the duct 24 receive respective support rods 46 through their lower apertures 45 so that these support rods extend beneath the first pair of support rods 46 at the duct corners 36. The provision of a pair of vertically offset rod-receiving apertures 44 and 45 in each flange 42 of the mounting brackets 34 allows the same mounting brackets 34 to be used at each of the corners 36 of the duct 24 without concern for whether a support rod is to be disposed above or below another support rod at the corners, which significantly facilitates rapid assembly of the support frame 22.

In the illustrated embodiment, at least the end portions 48 of the support rods 46 are threaded, and nuts 50 or other threaded members are threadably engaged with the support rods 46 to clamp the mounting brackets 34 and support rods 46 to the duct. The nuts also prevent lateral displacement of the support rods 46 with respect to their mounting brackets 34. Following insertion of the support rods 46 into their respective pairs of rod-receiving apertures 44 or 45 of the mounting brackets 34, nuts 50 are screwed onto either end of the support rods 46 and screwed into abutment with respective flanges 42 of the mounting brackets 34 to secure the support rods 46 in stationary position adjacent respective sides 30 of the duct 24. The nuts 50 are tightened to draw respective pairs of mounting brackets 34 toward one another to securely clamp the mounting brackets 34 and support rods 46, which define the support frame 22, in a stationary position on the discharge vent duct. Accordingly, the support frame 22 is mounted to the discharge vent duct 24 in a secure, stationary position without screwing or nailing into the discharge vent duct 24, so that the integrity of the discharge vent duct is maintained. Lock washers 51 may be employed inwardly of the nuts 50 to prevent loosening of the nuts. Manifestly, a wide variety of other means for retaining stationary engagement between the support rods 46 and the mounting brackets 34 are well known to those skilled in the art and may be used in place of, or in addition to, the nuts 50 without departing from the invention.

Accordingly, at this stage of assembly, a support frame 22 is provided which is mounted to the grease discharge vent duct 24 at any position along the duct 24. Hence, the support frame 22 may be positioned in spaced relation from the roof 28 through which the discharge vent duct 24 protrudes. This makes the shape and composition of the roof immaterial to mounting and usage of the filter assembly 20; whereas, with roof-mounted structures of the prior art, the configuration and composition of the roof greatly affects the mounting and usage of the prior art roof-mounted filter assemblies. For instance, roof-mounted structures do not lend themselves to application with tiled roofs or roofs having gravel, or roofs which are angled significantly with respect to the discharge vent; whereas the grease filter assembly of the present invention is well suited for any and all of these roof conditions. Once the support frame 22 is mounted to the discharge vent duct 24, it remains mounted to the duct as a semi-permanent fixture to which grease absorbing materials such as the pads 32 may be mounted and removed as required with the support frame 22 remaining in stationary position mounted to the duct 24.

A plurality of grease absorbing pads 32 are each supportable on top of the support frame 22 adjacent respective sides 30 of the duct 24. The grease absorbing pads 32 are made longer than the sides 30 of the duct 24 against which they are disposed, so that the pads 32 overlap one another at the corners 36 of the duct 24 as shown in FIG. 1. For the rectangular duct 24 illustrated in the drawings, four pads 32 are employed. Preferably, a first pair of pads 32 are positioned adjacent a first pair of opposite sides 30 of the duct 24, and then a second pair of pads 32 are positioned adjacent the remaining pair of opposite sides 30 of the duct 24, with the end portions of the second pair of pads overlapping the end portions of the first pair of pads as shown in FIG. 1. More specifically, the first pair of grease absorbing pads 32 are supportable on both of the end portions 48 of a first pair of oppositely disposed support rods 46 which extend beyond their respective walls 30 of the duct 24. A second pair of grease absorbing pads 32 are supportable on both of the end portions 48 of the first pair of grease absorbing pads 32 as well as the end portions of the first pair of pads 32. Accordingly, the support frame 22 supports the grease absorbing pads 32 in surrounding relation about the discharge vent duct 24 and in spaced relation from the roof 28. The grease absorbing pads 24 are preferably composite pads as described in detail below.

Figure 4:
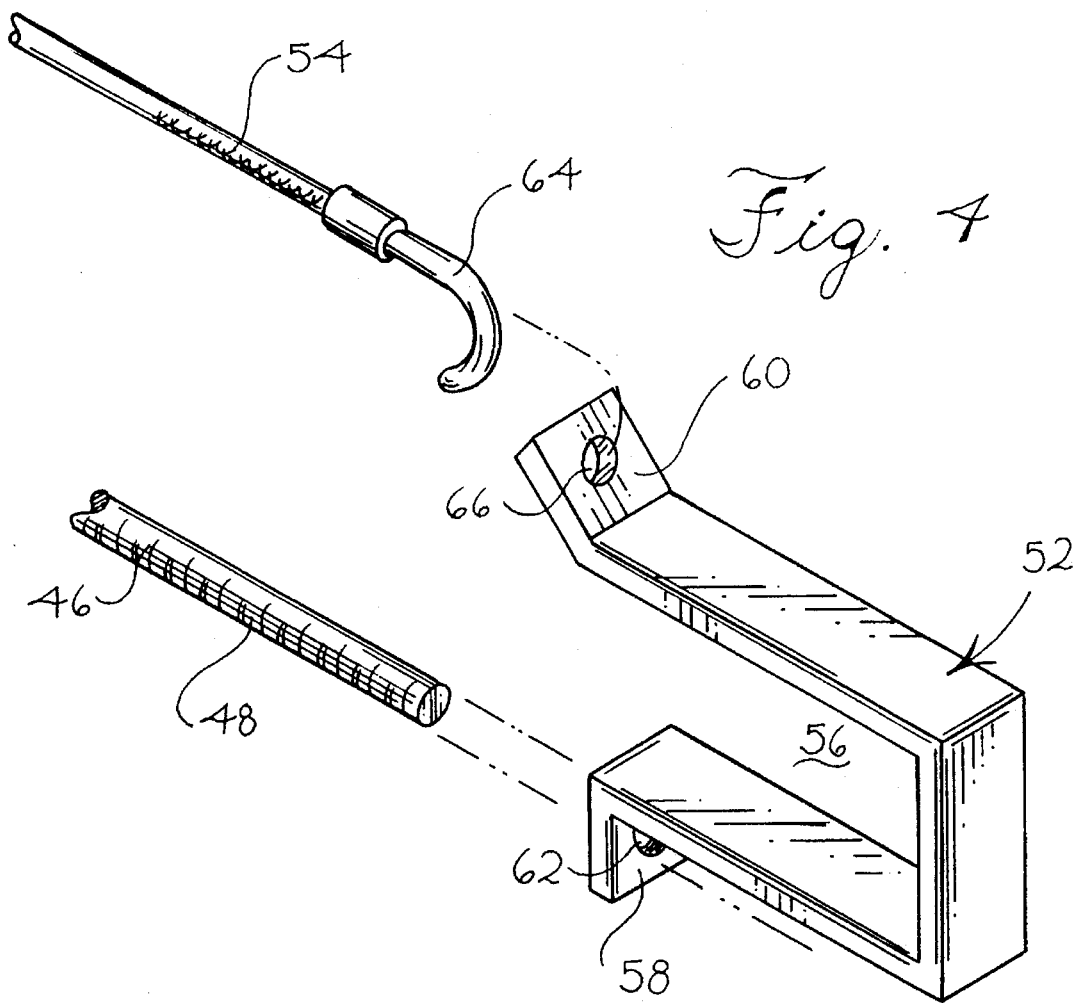
FIG. 4 is an enlarged perspective view of a retaining clip of the grease filter assembly of FIG. 1 embodying various features of the present invention.

In order to maintain the grease absorbing pads 32 abutting respective sides 30 of the duct 24, and in engagement with the support frame 22 through adverse wind and weather conditions, U-shaped retaining clips 52 and tension cords 54 are employed as illustrated in FIG. 1. With reference to FIG. 4, the retaining clips 52 define an integral U-shaped channel 56 having a rod-engaging tab 58 and cord-engaging tab 60. The rod-engaging tab 58 has a rod-receiving aperture 62 for slidable receipt of a support rod 46 therethrough. A retaining clip 52 is inserted onto each end of each support rod 46 by sliding the clips 52 onto the end portion 48 of the support rod 46, with the end portion 48 of the support rod 46 sliding into the aperture 62 of the retaining clip 52.

Another retaining clip 152 is illustrated in FIG. 8. In this retaining clip 152, the rod engaging tab 58 and rod-receiving aperture 62 are replaced by an elongated tube 158 welded to the underside of the lower leg 61 of the U-shaped retaining clip. The tube 158 defines a rod-receiving aperture 162 through which the end portions 48 of the rods 46 are received as the retaining clips 152 are slid onto their respective rods 46.

A grease filter assembly 120 employing the retaining clip 152 is illustrated in FIG. 9. The tubes 158 have been found to make sliding of the retaining clips 152 onto their respective rods 46 easier than the aforementioned rod engaging tab 58 and aperture 62. Also, the tubes 158 have been found to prevent hang-up in the sliding of the retaining clips 152 onto the support rods 46, allowing the retaining clips 152 to slide easily and relatively unimpeded along the rods to assure that the tension cords 54 pull the grease absorbing pads 32 into firm abutment with their respective sides 30 of the grease discharge duct 24. The retaining clips 52, which do not use a tube 158, have been found to occasionally get stuck on the threads at the end portions 48 of the support rods 46, which prevents the grease absorbing pads 32 from being pulled all the way into abutment with their respective sides of the grease discharge duct 24.

The outer edge portions 63 of the grease absorbing pads 32 are received within respective U-shaped channels 56 of the retaining clips 52. The retaining clips 52 are each disposed at overlapping pad portions with the edge portions 63 of both overlapping pads 32 being received within the U-shaped channel 56.

Accordingly, as best seen in FIG. 1, the grease absorbing pads 32 define a generally rectangular surface when supported on the support frame 22 and there are preferably two retaining clips 52 disposed on each side of the rectangle defined by the pads 32. For retainment of the pads 32 with the support frame 22 and biasing of the pads into abutment with respective sides 30 of the duct 24, pairs of oppositely disposed retaining clips 52 are interconnected by tension cords 54. With continued reference to FIG. 1, following insertion of retaining clips 52 onto either end of a support rod 46, with the pair of overlapping portions of the grease absorbing pads 32 being received in the U-shaped channels 56 of the retaining clips 52, hooks 64 disposed at the either end of a tension cord 54 are engagingly received in respective hook-receiving apertures 66 of the cord-engaging tabs 60 of the retaining clips 52 to pull the respective pair of oppositely disposed retaining clips 52 toward one another. The extent of inward movement of the retaining clips 52 is limited by abutment of the inner edge of the pads with the duct sides 30 and abutment of the retaining clips 52 against the outer edges 63 of the pads 32. The tension cords 54 thereby to prevent the retaining clips 52 from sliding off of their respective rods 46 maintain the retaining clips 52 in engagement with respective support rods 46 and also serve to maintain a biasing force on the pads 46 holding the pads 46 in abutment with respective sides 30 of the duct 24. Good results have been provided by eight retaining clips 52 and four tension cords 54 retaining four grease absorbing pads 32 on four support rods 46 in the manner illustrated in FIG. 1.

As mentioned briefly above, the preferred grease absorbing pads 32 are composite pads having the preferred construction which will now be described with reference to FIGS. 5 and 6. An outer porous layer 70 of material is provided for trapping particulate debris 71, which outer layer 70 is also permeable for passage of water 73 and liquid grease therethrough. The outer porous layer 70 of material is sealed on three sides, such as by heat sealing or the like, to create a pocket into which the remaining elements of the grease absorbing pads 32 are received. The composite grease absorbing pads 32 are comprised of a layer of grease absorbing and water passing material 74, a layer of water-repellent grease absorbing material 76, and a layer of plastic-backed grease absorbing material 78, all of which are supported on a wire frame 80. The pads and the wire frame 80 are disposed within the outer porous material 70.

The composite grease absorbing pad 32 of the present invention is suitable for absorbing air-borne grease discharged from a grease discharge vent, both when the pad 32 is exposed to precipitation together with the grease, and in the absence of precipitation. The composite pad 32 absorbs grease and passes any water discharged onto the pad, so that substantially no grease is discharged from the pad 32 onto the roof. More specifically, with specific reference to FIG. 6, in rainy conditions a mixture of water 73 and grease 75, which may also include some particulate 71, is dispensed onto the grease absorbing pad 32. The grease and water mixture first passes through the upper layer 82 of the outer porous material 70 which filters out particulate 71, but allows both the water 73 and the grease 75 to pass substantially completely therethrough.

The water 73 and grease 75 mixture then passes through the layer of grease absorbing and water passing material 74 which absorbs a substantial portion of the grease 75, but allows the water 73 to pass substantially completely therethrough. Hence, the mixture of water and grease passed through the layer of grease absorbing and water passing material 74 has a significant portion of the grease 75 absorbed by the grease absorbing material 74 with substantially all of the water 73 and a portion of the grease passed completely through the material 74.

The water and grease then encounter the layer of water-repellent grease absorbing material 76 which absorbs grease from the grease and water mixture but blocks substantially all of the water 73 to prevent the water 73 from passing through the water-repellent grease absorbing material 76. Hence, the water-repellent grease absorbing material 76 redirects the direction of flow of the water which exits the layer of grease absorbing material 74 to run horizontally to the periphery of the pad 34 and roll off the pad. Any grease mixed in with the water which exits the layer of grease absorbing material 74 also runs horizontally along the upper surface of the water-repellent grease absorbing material 76, whereby the water and grease mixture is in contact with both the grease absorbing material 74 and the water-repellent grease absorbing material as its flows outwardly to the periphery of the pad. The redirecting of the flow outwardly to the periphery of the composite pad 32 provides prolonged contact between the water and grease mixture 73 and 75 and both of the grease absorbing materials 74 and 76, to provide increased absorption of the grease.

The pads are made sufficiently large that substantially all of the grease 75 is absorbed by the grease absorbing materials 74 and 76 by the time the mixture has run to the periphery of the pads. Accordingly, only water remains unabsorbed by the pad 34, and the water 73 runs off the sides of the layer of water-repellent grease absorbing material 76 and is allowed to fall onto the roof. Since virtually no grease remains in the water which falls onto the roof, deterioration of the roofing material is significantly reduced.

A product sold by DuPont Corporation under the tradename "TYWIK" has been found to be well suited for use as the layer of grease absorbing and water passing material 74.

A polypropylene product sold by New Pig Corporation of Tipton, Pa. under the tradename "MAT 403" has been found to be well suited for use as the layer of water-repellent grease absorbing material 76. However, a wide variety of other suitable materials are readily available, and the invention is not limited to the particular materials discussed above.

As a fail-safe measure, a layer of plastic-backed grease absorbing material 78 may be provided and disposed beneath the layer of water-repellent grease absorbing material 76. Should the layer of water-repellent grease absorbing material 76 fail to be timely changed, and an amount of grease in excess of the predetermined amount of grease which the layer of water-resistant grease absorbing material is capable of absorbing, be allowed to accumulate, the layer of water-repellent grease absorbing material 76 may not be able to absorb any more grease. The extra layer of plastic-backed grease absorbing material 78 in contact with the layer of water-repellent grease absorbing material 76 would then absorb the excess grease. The plastic backing of the layer of plastic-backed grease absorbing material 78 is also a precautionary measure which serves to block water or grease from exiting downwardly through the lower layer 78 and onto the roof in the event water somehow managed to come into contact with the layer of plastic-backed grease absorbing material 78. A product sold by New Pig Corporation under the tradename "MAT 285" has been found to be well suited for use as the layer of plastic-backed grease absorbing material 78.

It will now be appreciated that in the grease absorbing pad 74, all of the layers of grease absorbing materials, including the layer of grease absorbing and water passing material 74, the layer of water-repellent grease absorbing material 76, and the layer of plastic-backed grease absorbing material 78, are stacked one upon the other and supported upon a wire frame 80. Hence, the wire frame 80 must support the load of the grease absorbing material layers, and in many instances a significant amount of grease and water as well, although most of the water should be expelled from the pad 74 as described earlier. Therefore, the wire frame 80 should be formed of wires of sufficiently large gauge to adequately support the aforementioned grease and possibly water soaked pads, particularly at the corners at which the grease absorbing pads 74 overlap and there is no support directly beneath the pads.

This pad construction is inexpensive to produce, lightweight, lends itself to easy engagement and removal from the support frame 22, and is readily disposable following a predetermined amount of grease absorption. No disassembly of the support frame 22 or composite pads 32 is required for periodic replacement of soiled pads 32.

Since the pads 32 rest upon the support frame 22, and may extend outwardly of the rods 46 of the support frame 22, it is not necessary to cut the pads 32 to accommodate differently sized ducts 24. This presents a significant advantage over the aforementioned patented roof-mounted construction in which the pads are required to be completely disposed within the space between an outer frame and the periphery of the duct, requiring that the pads be shaped to conform to the configuration of the space between the frame and the duct. This necessitates different pad shapes and sizes for each differently shaped and differently sized duct. Contrarily, in accordance with the grease filter assembly 20 of the present invention, only a single size pad and frame is required for accommodating a wide variety of different sizes and shapes of ducts.

A complete changeover of pads to replace soiled pads with new pads is carried out by removing the tension cords 54, sliding the retaining clips 52 off their respective rods 46, removing the soiled pads 46, positioning clean pads 46 on the support frame 22, sliding the retaining clips back onto their respective rods 46, and attaching the tension cords 54. The entire pad replacement process has been found to take only approximately five minutes. The pad changeover can be carried out rapidly and completely without the aid of tools or trained servicepeople as required to custom-fit the grease-absorbing material of the previously-described patented device. The pads 46 are preferably disposable, and the soiled pads 46 may be discarded following their removal from the support frame 22. As discussed above, the support frame 22 remains clamped in place throughout the repeated interchanging of pads 46.

Figure 7:
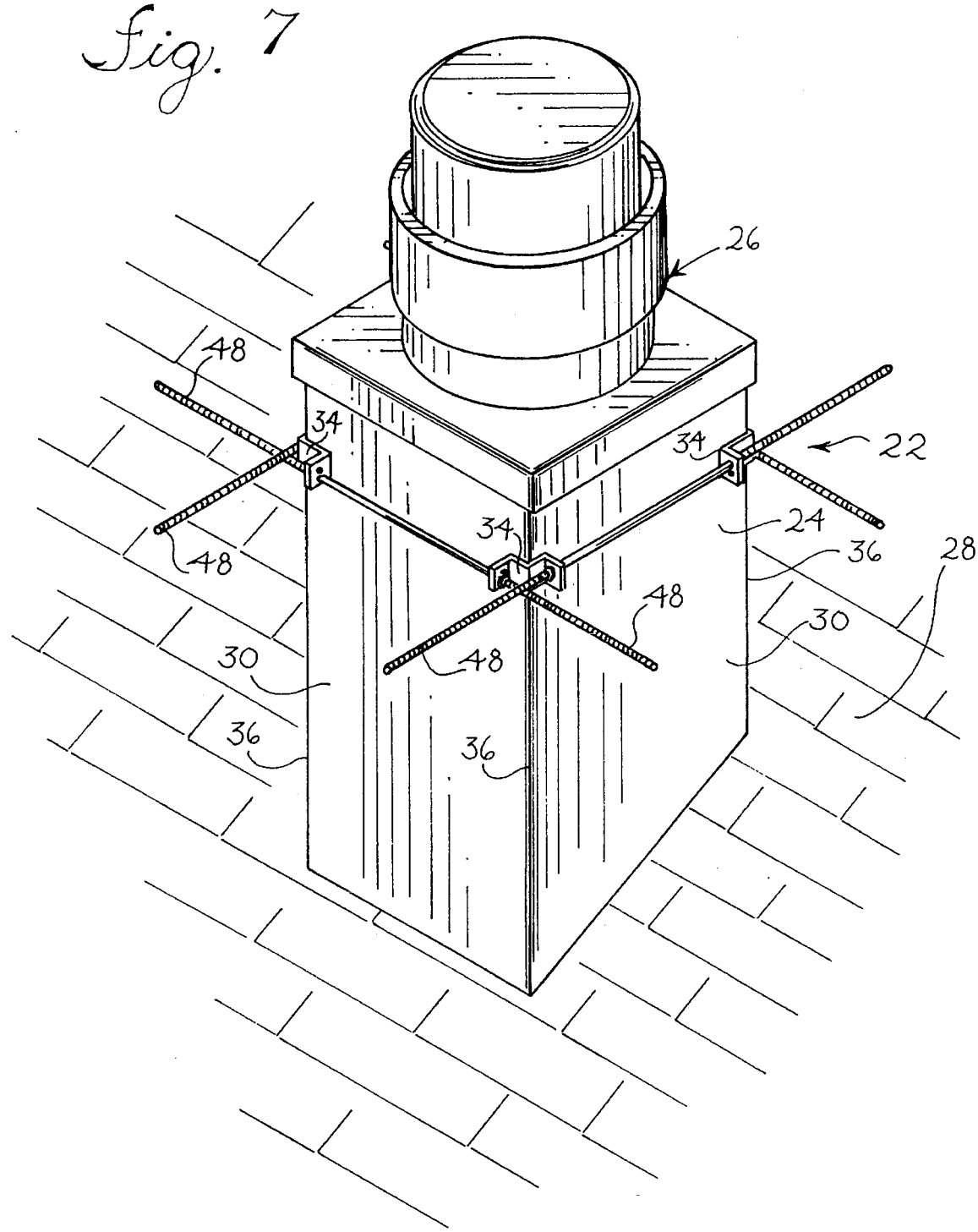
FIG. 7 is a perspective view of a support frame embodying various features of the present invention shown mounted to a tall grease discharge vent duct.

Also, since the support frame 22 mounts to the duct 24 of the discharge vent 26 rather than the roof 28, the shape, angle and type of roof is immaterial to secure mounting of the support frame 22 and proper operation of the grease filter assembly 20. One of the advantages of the duct-mounted grease filter assembly 20 of the present invention over roof-mounted grease filter assemblies of the prior art is illustrated in FIG. 7 which shows a roof 28 which is significantly angled with respect to the duct 24. Current roof-mounted structures are not suitable for roof configurations such as that shown in FIG. 7. Since the support frame 22 of the grease filter assembly 20 of the present invention mounts to the duct 24 in spaced relation from the roof 28, it is equally well suited for angled roof configurations as well as flat roofs. Also, with a grease discharge vent 26 such as that of FIG. 7 in which the duct 24 extends a significant distance upwardly from the roof 28, mounting the assembly at the roof 28, as required with prior art structures, leaves the grease absorbing materials spaced too far from the grease discharging end of the vent 26 to catch discharged grease before it blows away from the pads; whereas the grease filter assembly 20 of the present invention is mountable directly beneath the grease discharge end of the vent 26 to catch the discharged grease before it blows away. Further, standing water on the roof 28 is detrimental to roof-mounted structures, but since the grease filter assembly 20 of the present invention mounts to the duct 24 of the grease discharge vent 26 in spaced relation from the roof 28, standing water on the roof 28 does not adversely affect the operation and integrity of the grease filter assembly 20.

In another form of the grease filter assembly 20, a single grease pad 32 is utilized where the grease discharge vent 26 includes, or which can be adapted to include a grease discharge opening, preferably in the form of a spout 170 which directs grease out of the vent adjacent one side of the duct 24. Since only a single grease-absorbing pad 32 is utilized, the support frame 22 can be slightly modified over the previously-described embodiment wherein pads 32 surrounded the vent duct 24. To support a single pad 32, it is only necessary that the rods 46 have their end portions 48 extending away from the duct 24 at the two corners 36 of the duct wall 30 to which the grease-absorbing pad 32 is abutted.

Manifestly, only two retaining clips 52 or 152 need be used in the single pad arrangement. Also, because only a single pad 32 is utilized, the clips 52 or 152 can have a narrower channel 56 as they no longer need be sized to accommodate two grease-absorbing pads 32 as in the previously described multiple pad arrangement.

Figure 10:
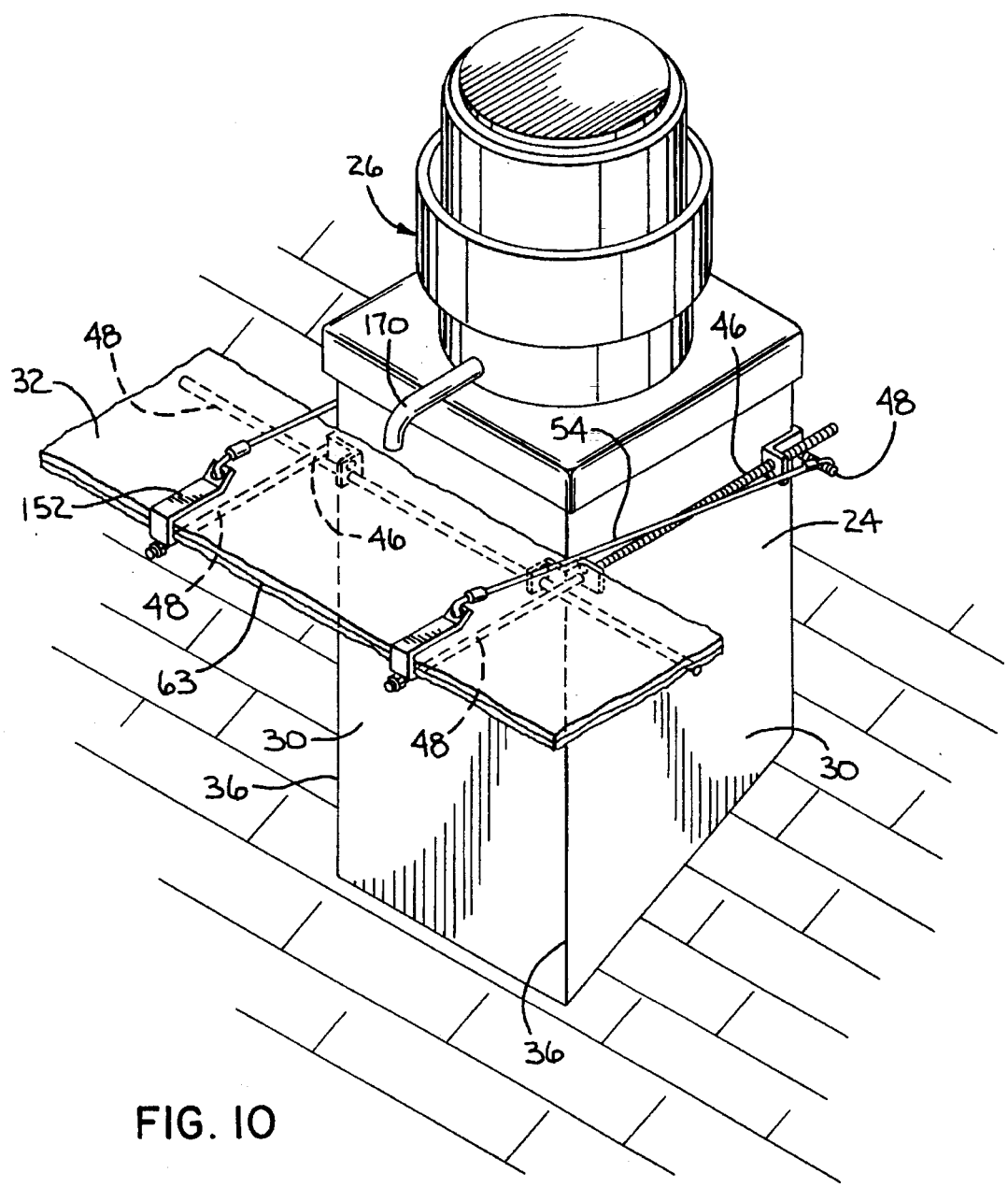
FIG. 10 is a perspective view, similar to FIG. 7 of a tall grease discharge vent duct including a grease discharge spout and showing a support grid as used with a single discharge pad below the spout.

More specifically, referring to FIG. 10, two clips 152 are shown slid onto end portions 48 of respective rods 46 extending outwardly at right angles from the duct wall 30 to which the pad 32 will be abutted by inserting the end portions 48 into and through the tubes 158 of the clips 152. Thereafter, one end of the tension cords 54 are hooked to the retaining clips 152 as previously described, and at their other end to projecting portions 48 of the rod 46 which is adjacent the wall 30 opposite the wall to which the pad 32 is abutted with the portions 48 projecting only slightly beyond that wall since they serve no pad-supporting function. Alternatively, the projecting portions 48 of the rod 46 adjacent the opposite wall 30 need not be provided and instead the other end of the cords 54 can be connected to an open hole 44 or 45 in the respective brackets 34 at the opposite corners of the opposite wall. Similarly, the rod 46 adjacent the wall 30 to which the single pad 32 is abutted need only have end portions 48 which extend from corners 36 a sufficient distance to provide support along the length of the pad 32 and can therefore vary in length depending on the length of the pad 32.

Thus, with the single pad 32 supported on the end portions 48 of rods 46 along one side of the duct 24 under the spout 170 and with the clips 152 in place on the rod end portions 48, connecting the tension cords to the clips 152 and to the end portions 48 of the rod 46 adjacent the opposite wall of the duct 24, or to open holes in brackets 34 at corners of the opposite wall, causes the clips 152 to be pulled inwardly towards the duct wall 30 so as to engage the outer edge 63 of the pad 32 and move the pad into abutment with the duct side wall 30 thereby securely maintaining the pad 32 on top of the rod ends 48 in abutment with the duct side wall 30 and facilitating absorption of grease leaking down the side of the duct wall without the need for flashing screwed into the duct to redirect the grease onto the pad 32.

By utilizing the single pad assembly as described above, there are cost savings which can be realized over the grease filter assembly used with fans that leak grease from around all sides of the duct which accordingly require the grease-absorbing pads 32 to surround the duct 24 to catch grease discharged from the fan. Thus, where the fan is built having a spout 170, or is adapted to include a spout 170, for directing grease along one side of the duct, the grease filter assembly 20 described above lowers costs in requiring the use of only two retaining clips 152 and two tension cords 54 with the single pad 32.

While the invention has been described with reference to specific embodiments, it will be understood to those skilled in the art that various changes and modifications may by made, and equivalents may be substituted for elements thereof, without departing from the scope of the invention. For instance, while the description of the invention is directed to rectangular ducts 24, the support frame 22 is engageable to circular or other duct shapes, and manifestly the grease filter assemblies 20 of the present invention are not limited to application to any particular duct shape or size. It is intended that the invention not be limited to the particular embodiments disclosed herein, but that the invention will include all embodiments falling within the scope of the appended claims.

What is claimed is:

1. A grease filter assembly for absorbing grease from an opening or spout in a grease discharge vent having a duct extending from a roof, the assembly comprising:

a support grid capable of being mounted to a grease discharge vent duct in spaced relation to a roof;

grease absorbing material supportable on top of the support grid and positionable adjacent a side of a discharge vent duct; and retaining means for retaining the grease absorbing material on the support grid adjacent a side of a discharge vent duct and in spaced relation to a roof, wherein the support grid comprises a plurality of support rods for being positioned generally horizontally adjacent sides of a discharge vent duct and a plurality of mounting brackets each having means for engaging respective support rods for clamping of the mounting brackets and support rods to a vent duct to support rods adjacent their respective sides of a duct, and the retaining means includes a pair retaining clips each including a rod receiving portion and a tension cord receiving portion and a pair of tension cords for pulling the clips towards a side of a duct into engagement with the grease absorbing material to maintain the grease absorbing material in abutment with a side of a duct below a spout to absorb grease discharged therefrom with the portions of the clips receiving respective rods and tension cords.

2. A grease filter assembly for absorbing grease from an opening or spout in a grease discharge vent having a duct extending from a roof, the assembly comprising:

a support grid capable of being mounted to a grease discharge vent duct in spaced relation to a roof;

grease absorbing material supportable on top of the support grid and positionable adjacent a side of a discharge vent duct; and retaining means for retaining the grease absorbing material on the support grid adjacent a side of a discharge vent duct and in spaced relation to a roof, wherein the support grid includes a plurality of support rods and brackets with the rods extending through and being supported by the brackets and the brackets being clamped to a vent duct to position the rods adjacent respective sides of a vent duct, there being at least two rods each having a portion extending away from a duct for supporting the grease-absorbing material on top of said rod portions and adjacent a duct side.

3. An apparatus for absorbing grease from a grease discharge vent having a duct and grease discharge opening or spout, the grease absorbing apparatus comprising:

a grease absorbing pad having a layered construction to absorb grease discharged from a vent spout and expel water from the pad;

a support grid for the pad including a plurality of cooperating support rods and brackets with the rods extending through the brackets and the brackets being clamped to a vent duct to position the rods between a pair of brackets adjacent sides of a vent duct; and means for maintaining the pad on the grid adjacent a side of a vent duct below a vent spout with the maintaining means being adjustable to allow said grease absorbing pad to be used with a variety of differently sized vent ducts.

4. The grease absorbing apparatus of claim 3 wherein the grease absorbing pad has a rectangular configuration and includes continuous surfaces about its entire extent.

5. The grease absorbing apparatus of claim 3 wherein the maintaining means includes a first and a second retaining clips each having a lower rod receiving portion and first and second tensioning cords attached to the first and second clips, respectively, for pulling the clips into engagement with the pad and moving the pad into engagement with a duct side below a vent spout to securely maintain the pad on top of the rods abutting a duct side.

6. The grease absorbing apparatus of claim 3 wherein the pad comprises a top layer, a middle layer below the top layer formed from a material which repels water and absorbs grease, and a bottom layer below the middle layer formed from a material which absorbs grease and includes an impermeable plastic backing thereunder to prevent water from escaping from the bottom of the pad.

7. The grease absorbing apparatus of claim 6 wherein the top layer is formed from a material which absorbs grease and allows water to pass therethrough.

8. The grease absorbing apparatus of claim 6 wherein the pad includes an outer covering layer formed from a porous material which allows grease and water to pass therethrough with the covering layer forming a pocket into which the top, middle and bottom layers are inserted.

9. The grease absorbing apparatus of claim 3 in combination with a grease discharge vent having a duct and a grease discharge spout.

* * * * *